United States Patent [19]

Price

[11] Patent Number: 4,485,119
[45] Date of Patent: Nov. 27, 1984

[54] ELECTRIC GEAR DRIVE NUTCRACKER

[76] Inventor: William M. Price, Rte. 4, Box 226, Wake Forest, N.C. 27587

[21] Appl. No.: 601,707

[22] Filed: Apr. 18, 1984

[51] Int. Cl.³ .............................................. A23N 5/00
[52] U.S. Cl. ..................................... 426/482; 99/571; 99/577; 426/481
[58] Field of Search ................ 99/568, 571, 572, 577, 99/578, 579, 580, 581-583; 426/481-483, 479; 30/120.1, 120.2, 120.5

[56] References Cited

U.S. PATENT DOCUMENTS

| | | | |
|---|---|---|---|
| 2,707,503 | 5/1955 | Johnson et al. | 99/578 |
| 3,524,486 | 8/1970 | Turner | 99/571 X |
| 3,841,212 | 10/1974 | Powell | 99/571 |
| 3,858,501 | 1/1975 | Pfeiffer | 99/571 |
| 4,332,827 | 6/1982 | Quantz | 426/482 X |

Primary Examiner—Timothy F. Simone
Attorney, Agent, or Firm—Mills and Coats

[57] ABSTRACT

The present invention entails an impact nutcracker having an electric gear drive for automatically and continuously cocking the nutcracker. A striker is movably mounted adjacent an impact nutcracking assembly, and the striker is movable between a cocked position and an impact position. Biasing means are attached to said striker for biasing the same toward said impact position. A gear, driven by an electric motor, is operative to drive and move the striker from said impact position to said cocked position at which point the gear is disengaged and the striker is released, and under the influence of said biasing means the striker moves back to said impact position where the same impacts against said impact nutcracking assembly.

12 Claims, 5 Drawing Figures

ELECTRIC GEAR DRIVE NUTCRACKER

FIELD OF INVENTION

The present invention relates to nutcrackers and more particularly to electric powered nutcrackers.

BACKGROUND OF INVENTION

The "Inertia" nutcracker shown in U.S. Pat. No. 3,524,486 and produced and sold by the Charter Company of Raleigh, N.C., has over the past years been one of the most, if not the most, successful nutcrackers marketed in the United States. Its success can be attributed to a number of factors, one of which is its ability to crack the shell of the nut without breaking the inner kernel.

The "Inertia" nutcracker referred to above has in the past been of a manual design and as such has included a striker that in operation is manually cocked. To cock the "Inertia" nutcracker requires that the striker be pulled against the tension of one or more of rubber bands to a cocked position, after which the striker is released such that it may impact against an impact nutcracking assembly that holds the nut to be cracked. While this design, as pointed out above, has met with great success, it is known that there is a desire by certain customers for a fully automatic nutcracker.

There have been attempts in the past to provide automatic or powered nutcrackers. For example, note the electric nutcracker shown in U.S. Pat. No. 3,841,212. This nutcracker is powered by an electrically operated solenoid. With such automatic nutcrackers, it has been found that they are generally expensive, complicated, and sometimes unreliable. Equally as important, is the fact that most powered or automatic nutcrackers have been of a design that do not produce a whole inner kernel. It is believed that it is very important in any nutcracker that the same produce a whole inner kernel.

Therefore, there is a need for a powered or automatic nutcracker that will produce whole kernel nuts and which is simple, relatively inexpensive, and reliable.

SUMMARY AND OBJECTS OF THE INVENTION

The present invention entails an electric powered impact nutcracker having an impact nutcracking assembly that is designed to receive and hold a nut therebetween. A striker is movably mounted adjacent the impact nutcracking assembly and is movable from an impact position adjacent said impact nutcracking assembly to a cocked position. Biasing means associated with said striker normally biases the same toward said impact position.

The present invention is provided with an electric gear drive for automatically and continuously cocking said striker. In particular, a gear rotatively mounted adjacent the striker is driven by an electric motor. In the course of operating the electric nutcracker of the present invention, the gear is rotatively driven which in turn is operative to drive and move the striker from the impact position to the cocked position. Once the striker reaches the cocked position, the gear is operative to be disengaged which releases the striker and enables the same, under the influence of the biasing means, to move to said impact position where the same impacts against the impact nutcracking assembly. The electric motor and associated gear can be continuously driven such that the nutcracker is re-cocked in periodic fashion.

It is therefore an object of the present invention to provide a relatively simple and inexpensive electric nutcracker that is efficient, effective, and reliable.

A further object of the present invention resides in the provision of an electric power nutcracker that has the capability to crack nuts such that the internal nut kernel remains whole and is not broken into pieces.

Still a further object of the present invention resides in the provision of an electric gear drive automatic nutcracker.

Another object of the present invention resides in the provision of an automatic electric gear drive nutcracker wherein a gear is utilized to drive and move a biased striker from an impact position to a cocked position after which the gear is operative to be disengaged so as to release the striker and enable the same, under the influence of biasing means, to move back to said impact position.

Another object of the present invention is to provide an automatic electric nutcracker that is operative to continuously and periodically cock and re-cock the nutcracker.

A further object of the present invention resides in the provision of an automatic electric nutcracker of the character referred to above that includes a timing control that provides a pre-selected time period between "impacts" such that the nutcracker can be unloaded and loaded during these time periods.

Another object of the present invention resides in the provision of an automatic electric gear drive for an impact type nutcracker wherein there is provided means for enabling the gear to be efficiently disengaged during its operation without interference with the striker as it returns to its impact position.

Other objects and advantages of the present invention will become apparent from a study of the following description and the accompanying drawings which are merely illustrative of such invention.

Figure 1:
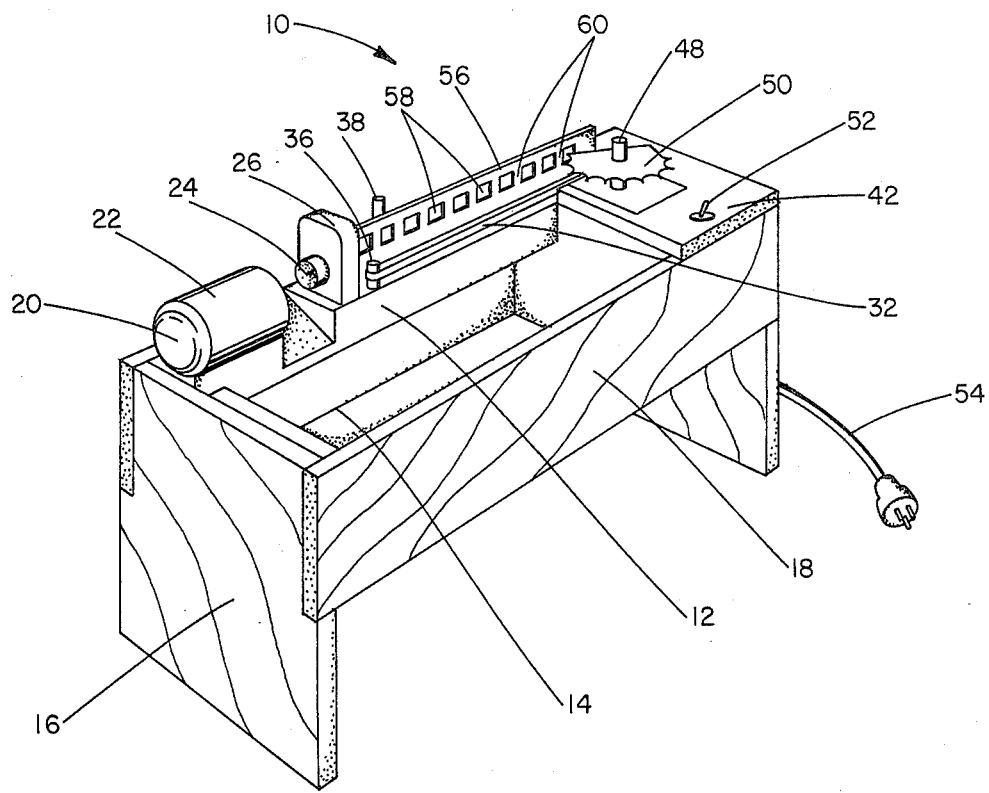
FIG. 1 is a perspective view of the electric gear drive impact nutcracker of the present invention.

With further reference to the drawings, the nutcracker of the present invention is shown therein and indicated generally by the numeral 10.

Nutcracker 10 comprises a frame structure 12 that supports the nutcracker over a bin structure 14 that is formed by a pair of opposed end plates 16 joined by a pair of side walls 18. It is appreciated that during operation that hulls and shells resulting from the nutcracking operation may fall into bin 14.

Nutcracker 10 is of the basic impact nutcracker design such as shown and disclosed in U.S. Pat. No. 3,524,486, the disclosure thereof being expressly incorporated herein by reference. Generally, nutcracker 10 includes a nutcracking assembly that comprises an anvil 20 and an impact member 24. Impact member 24 and anvil 20 includes opposed concave nut receiving and engaging surfaces for receiving a nut therebetween. In addition anvil 20 includes a shield 22 that is spring biased to lie over anvil 20 but which allows shield 22 to be extended over the area occupied by the nut held between the concave surfaces of anvil 20 and impact member 24.

It should be noted that impact member 24 is held within block 26 and is movably mounted therein for limited back and forth movement. Impact member 24 further includes a striking head 24a.

Figure 4:
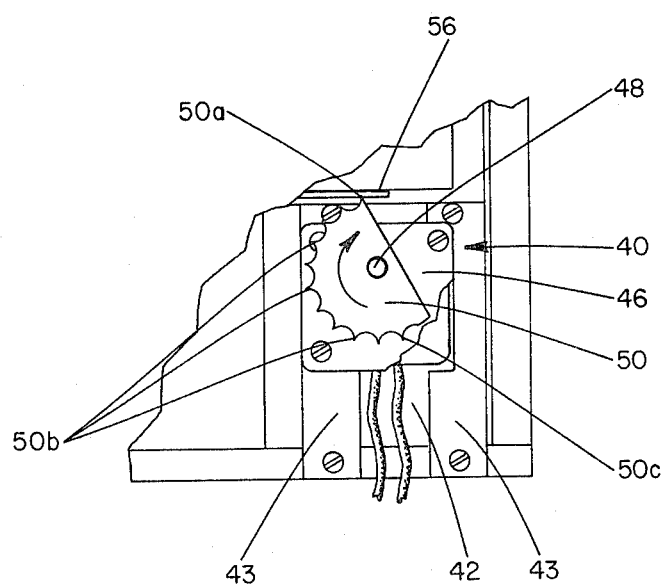
FIG. 4 is a top plan view of the electric gear driven nutcracker of the present invention with the striker thereof shown in an extended or cocked position.
Figure 5:
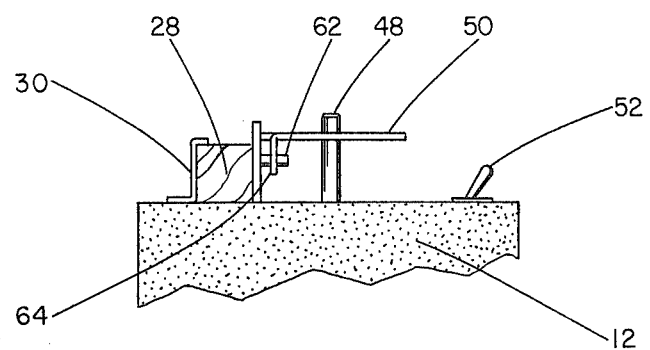
FIG. 5 is a fragmentary sectional view illustrating the stud extending from the striker drive bar and the stud catcher extending from the gear.

Movably mounted adjacent striking head 24a is an elongated striker 28. Striker 28 is held within a channel forming structure 30 that allows striker 28 to slide and move between an impact position (FIG. 2) and a cocked position (FIG. 4). It is appreciated that in the cocked position that striker 28 is spaced from striking head 24a.

Biasing means in the form of one or more rubber bands 32 is operatively associated with striker 28 so as to bias the same toward the impact position or that position where striker 28 engages striking head 24a. It is seen that biasing means 32 is operatively interconnected between dowels 34 and 36 with dowel 34 extending from striker 28 while dowel 36 is anchored to the frame structure 12 of nutcracker 10. In addition, striker 28 includes an upstanding handle 38 that, enables nutcracker 10 to be manually operated.

The above discussed structure is conventional with the "Inertia" nutcracker of the type shown and disclosed in U.S. Pat. No. 3,524,486 which has been expressly incorporated herein by reference. For a more complete and thorough understanding of this type of nutcracker and its design and structure, one is referred to this patent.

The present invention entails and electric gear drive for automatically cocking striker 28 of nutcracker 10. The electric gear drive is generally referred to by numeral 40.

Figure 3:
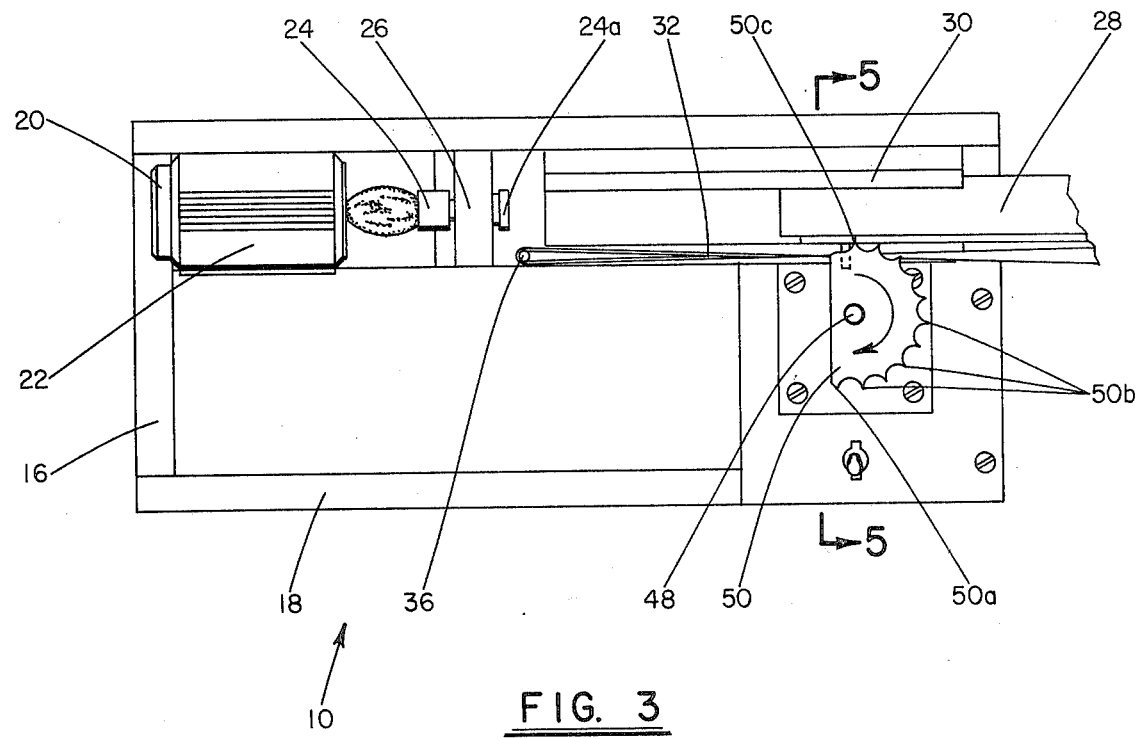
FIG. 3 is a fragmentary top plan view of the nutcracker of the present invention particularly illustrating the mounting of an electric motor that powers the nutcracker of the present invention.

Continuing to refer to the drawings, electric gear drive 40 includes a motor housing 42 that is integrally constructed with nutcracker bin 14. Motor housing 42 includes a pair of spaced apart motor supports, as seen in FIG. 3, which are designed to support an electric motor 44. There is also provided a motor mounting plate 46 that attaches electric motor 44 to the motor housing structure 42. It is further seen that motor 44 includes an electrical cord 54 extending therefrom and there is also provided a switch 52 that is operatively associated with motor 44 for actuating and deactuating the same.

Extending upwardly from motor 44 and through motor mounting plate 46 is a drive shaft 48. Drive shaft 48 has a gear 50 secured thereto. Gear 50 includes a series of teeth that are referred to as a gear teeth drive segment. It should be pointed out, as viewed in FIG. 2, that gear 50 is adapted to be rotatively driven clockwise. With that in mind, gear teeth drive segment includes a leading tooth 50a and a series of intermediate following teeth 50b, and a final tooth 50c.

Motor 44 and gear 50 are mounted adjacent striker 28. Secured to the side of striker 28 facing gear 50 is a striker drive bar 56. Striker drive bar 56 includes a series of aligned and longitudinally spaced gear teeth receiving openings 58. Respective openings 58 are formed by a series of vertical bars 60 that extend between consecutive openings 58.

Figure 2:
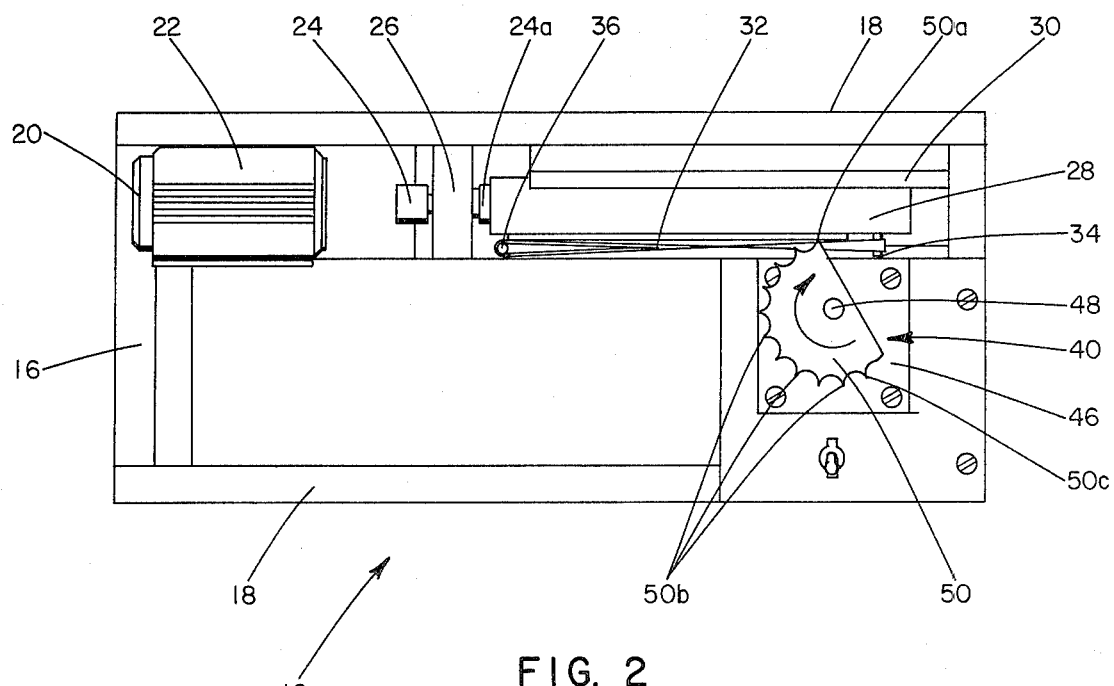
FIG. 2 is a top plan view of the electric gear drive impact nutcracker of the present invention.

Gear 50 and striker drive bar 56 are so arranged and spaced such that as gear 50 is rotated clockwise, as viewed in FIG. 2, the respective teeth thereof project into respective openings 58 of striker drive bar 56. As gear 50 is continued to be rotated, respective teeth engage respective vertical bars 60 of striker drive bar 56 and cause striker 28 to be moved and advanced left to right as viewed in FIG. 2. It is therefore appreciated that the clockwise rotation of gear 50, as viewed in FIG. 2, causes striker 28 to be moved from the impact position adjacent striking head 24a toward a cocked position, as shown in FIG. 4.

Electric gear drive 40 is designed such that once striker 28 reaches a pre-selected position spaced from striking head 24a, the gear 50 will disengage striker drive bar 56 so as to effectively release striker 28. By releasing striker 28, it is appreciated that the same will move toward said striking head 24a and because of the influence of biasing means 32 move toward said impact position and actually impact against striking head 24a. This impact will result in limited right to left movement, as viewed in FIG. 2, of impact member 24. This will result in a nut held between anvil 20 and impact member 24 being cracked.

It is seen that once the teeth of gear 50 disengage striker drive bar 56 that gear 50 will continue to rotate for a selected period of time without engaging striker drive bar 56. This enables the operator to remove the cracked nut and reload the nutcracker 10. In a continuous nutcracking operation, gear 50 will continue to rotate, clockwise as viewed in FIG. 2, and as the same rotates will effectively cock and release striker 28 one time for each complete revolution.

There may be a tendency for striker drive bar 56 to engage gear 50 and respective teeth thereon once the final tooth 50c begins to disengage the striker drive bar and the striker drive bar begins to return to the impact position. To assure that there is no initial interference between striker drive bar 56 and gear 50 upon disengagement of the final tooth 50c, the present invention has incorporated a mechanism that momentarily prevents striker drive bar 56 from moving back toward the impact position upon disengagement of the final tooth 50c. This mechanism comprises a stud 62 that extend outwardly from the side of striker 28 that faces gear 50. Stud 62 is particularly spaced on striker drive bar 56. There is also provided a stud catcher 64 that is designed to engage stud 62 as the final tooth 50c begins to disengage striker drive bar 56. Stud catcher 64 in this case includes a tooth like member that extends from gear 50 which generally trails the final tooth 50c. Stud catcher 64 in this case simply comprises a tooth that has been turned downwardly out of the plane of the other teeth, 50a, 50b, and 50c of gear 50. Specifically stud catcher 64 is curved down such that it aligns with stud 62. As illustrated in the drawings, as final tooth 50c disengages striker drive bar 56, stud catcher 64 is operative to engage stud 62 and to slightly advance striker drive bar 56 from left to right as viewed in FIG. 4. This slight advancement of striker drive bar 56 enables the teeth of gear 50 to clear the striker drive bar 56 such that the striker bar 56 does not engage and interfer with any other teeth as it returns from its cocked position to the impact position. As gear 50 continues to rotate stud catcher 64 will simply slide past and disengage stud 62 which will result in the entire striker 28 and striker drive bar 56 being released and the striker impacting against striking head 24a.

In operation, it is appreciated that there is a lapse of time between the time stud catcher 64 disengages stud 62 and when the first tooth 50a engages striker drive bar 56. This provides ample time for the cracked nut to be removed from the nutcracker and a new nut inserted between anvil 20 and impact member 24.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claim are intended to be embraced therein.

What is claimed is:

1. In an impact nutcracker having a frame structure, an anvil and an impact member disposed in alignment on said frame structure and normally spaced apart so as to define a space therebetween for receiving and retaining a nut, said impact member being mounted for limited movement toward said anvil and including a striking head, a striker movably mounted adjacent said striking head of said impact member and movable between a cocked position spaced from said striking head and an impact position directly adjacent said striking head, and biasing means for normally biasing said striker toward said impact position such that by moving said striker to said cocked position and releasing the same results in said striker moving towards said striking head due to the force of said biasing means resulting in said striker impacting against said striking head of said impact member so as to crack a nut held between said impact member and anvil, the improvement comprising an electric gear type drive associated with said impact nutcracker for continuously and automatically cocking and releasing said striker, said electric gear type drive comprising:

A. a striker drive bar secured to said striker to form a striker-striker drive bar assembly;

B. said striker drive bar including a series of spaced apart gear teeth receiving openings formed generally horizontally along said striker drive bar;

C. gear drive means rotatively mounted adjacent said striker-striker drive bar assembly for automatically cocking and releasing said striker by engaging said striker drive bar and moving said striker via said striker drive bar from said impact position to said cocked position and then releasing said striker drive bar such that said striker may move toward said striking head of said impact member under the influence of said biasing means;

D. said gear drive means including a gear rotatively mounted adjacent said striker drive bar and including a series of teeth means for projecting into the respective gear teeth receiving openings of said striker drive bar and for effectively driving said striker drive bar and said striker as said gear is rotated;

E. electric motor means drivingly connected to said gear for rotatively driving the same;

F. said teeth means including a gear teeth drive segment including a leading tooth that engages said striker drive bar and which begins to move said striker towards said cocked position, a series of intermediate teeth that continue to move said striker towards said cocked position, and final tooth; and G. means associated with said improved electric gear type nutcracker for engaging said striker-striker drive bar assembly and momentarily preventing the same from moving back toward said impact position in response to the last tooth of said tooth drive segment being disengaged from said striker drive plate in order to prevent said striker drive plate from engaging and striking teeth of said gear teeth drive segment as it moves and returns from said cocked position to said impact position.

2. The improved electric gear type drive nutcracker of claim 1 wherein said means for momentarily preventing the return of said striker to said impact position in response to the final tooth of said tooth drive segment being disengaged from said striker drive bar includes a stud projecting outwardly from said striker drive bar at a selected location thereon, and a stud catcher mounted on said gear adjacent said final tooth and trailing the same for engaging said stud as said final tooth disengages said striker drive bar and preventing said striker and said striker drive bar from starting to return to said impact position until the gear teeth of said tooth drive segment have cleared said striker drive bar.

3. The improved electric gear type drive nutcracker of claim 2 wherein said striker drive bar includes an elongated bar secured adjacent to one side of said striker and wherein said gear teeth receiving opening are longitudinally spaced thereon.

4. The improved electric gear type drive nutcracker of claim 1 including timing control means associated with said nutcracker for providing a time period between impact and recocking for allowing an uncracked nut to be inserted between said anvil and said impact member.

5. The improved electric gear type drive nutcracker of claim 3 wherein said timing control means is provided by providing an open space between said first tooth and said final tooth opposite said tooth drive segment such that as said open space rotates adjacent said striker drive bar said striker drive bar is not engaged and is not moved by said gear or the teeth provided thereon.

6. The improved electric gear type nutcracker of claim 4 wherein said stud is spaced below the teeth on said gear and wherein said stud catcher includes a particular tooth on said gear that is turned downwardly so as to lie in the path of said stud at a selected time in the cyclic operation of said nutcracker.

7. The improved electric gear type nutcracker of claim 1 wherein said gear of said gear drive means includes a gear portion and a non-gear portion and wherein said non-gear portion effectively provides a pause in the cocking of said striker of said nutcracker inasmuch as said striker drive bar is not engaged by said non-gear portion when the same is rotating adjacent said striker drive bar.

8. An electric gear drive automatic nutcracker comprising:

A. a frame structure;

B. a striker movably mounted on said frame structure and movable between a cocked position and an impact position;

C. biasing means operatively associated with said striker for biasing the same for movement toward said impact;

D. impact nutcracking means for receiving and holding a nut and for cracking the same in response to said striker moving from said cocked position to said impact position where the same effectively impacts against said impact nutcracking means;

E. an electric gear drive assembly for automatically cocking and releasing said striker in a continuous and repeating fashion;

F. said electric gear drive assembly including a striker drive bar secured to said striker and including a series of longitudinally spaced gear teeth receiving openings formed therein;

G. a drive gear rotatively mounted adjacent said striker drive bar and including a series of teeth projecting therefrom and operative upon rotation of said gear to project into respective gear teeth receiving openings of said striker drive bar for advancing and moving said striker drive bar;

H. electric motor means operatively connected to said gear for rotatively driving the same and for moving said striker from said impact position to said cocked position and wherein said teeth of said gear are so arranged and oriented with respect to said striker drive bar such that upon said striker drive bar reaching said cocked position said teeth of said gear effectively disengage and move away from said striker drive bar, releasing the same and allowing said striker to move from said cocked position to said impact position.

9. The electric gear drive automatic nutcracker of claim 8 wherein said series of teeth include a plurality of circumferentially spaced teeth that engage the respective teeth receiving openings of said striker drive bar as said gear is rotatively driven by said electric motor means; and wherein said series of teeth includes a final tooth and wherein said electric gear drive automatic nutcracker further includes means for temporarily preventing said striker drive bar from moving back towards said impact position after the final tooth of said series of teeth disengage and move from the respective tooth receiving opening of said striker drive bar so as to allow time for the teeth of said gear to adaquately clear said striker drive bar such that said striker drive bar will not interfer and engage the teeth of said gear as it moves from said cocked position to said impact position.

10. The electric gear drive automatic nutcracker of claim 9 wherein said means for temporarily preventing said striker from moving back toward said impact position in response to said last tooth being disengaged from said striker bar includes a stud catcher secured to said gear in trailing relationship with respect to said final tooth of said series of teeth provided on said gear; and a stud secured to said striker drive bar and selectively placed thereon such that as said final tooth disengages said striker drive bar said trailing stud catcher is operative to engage said stud and to prevent said striker from moving back to said impact position.

11. A method of automatically cocking and recocking a nutcracker having an impact nutcracking assembly for holding an uncracked nut therebetween, a movable striker movable between a cocked position and an impact position and biased to move from said cocked position to said impact position wherein the same impacts against said impact nutcracking assembly for cracking the nut therebetween, said method comprising the steps of:

A. actuating an electric motor and driving a gear operatively connected to said electric motor;

B. projecting respective teeth on said gear into gear teeth receiving openings formed on a striker drive bar secured to said striker;

C. moving said striker and said striker drive bar secured thereto from said impact position to said cocked position by rotatively driving said gear and advancing said striker toward said cocked position by rotating said gear while the teeth thereof are engaged with said striker drive bar and wherein the engagement of the teeth of said gear with said striker drive bar advances and moves said striker drive bar toward said cocked position;

D. disengaging the teeth of said gear from said striker drive bar when said striker reaches said cocked position, and releasing said striker and the attached striker drive bar from said gear and the teeth thereof in response to said striker reaching said cocked position;

E. striking said impact nutcracker assembly with said striker after said striker drive bar has been disengaged from said gear;

F. continuing to rotate said gear for a selected time period before said striker is advanced back to said cocked position by said gear in order that said nutcracker may be reloaded;

G. then engaging and advancing said striker drive bar with said gear and recocking said striker and releasing the same in order that the striker may impact again against said impact nutcracking assembly; and H. continuing the above steps in a continuous fashion for repeatedly cracking nuts.

12. The method of claim 10 including the step of holding said striker and striker drive bar momentarily in response to said gear disengaging said striker drive bar and preventing said striker drive bar from moving with said striker back toward said impact position in order that said gear and the teeth thereof may clear said striker drive bar before said striker and striker drive bar begin to move back towards said impact position.

* * * * *